(12) United States Patent
Saarinen et al.

(10) Patent No.: US 6,671,639 B2
(45) Date of Patent: Dec. 30, 2003

(54) METHOD OF DETERMINING SPEED OF ROTATION OF SQUIRREL-CAGE MOTOR AND A COMPUTER SOFTWARE PRODUCT TO CARRY OUT THE METHOD

(75) Inventors: Kari Saarinen, Vaasa (FI); Michal Orkisz, Krakow (PL)

(73) Assignee: ABB Research Ltd., Zurich (CH)

( * ) Notice: Subject to any disclaimer, the term of this patent is extended or adjusted under 35 U.S.C. 154(b) by 0 days.

(21) Appl. No.: 10/233,586

(22) Filed: Sep. 4, 2002

(65) Prior Publication Data

US 2003/0046014 A1 Mar. 6, 2003

Related U.S. Application Data

(63) Continuation of application No. PCT/FI01/00272, filed on Mar. 19, 2001.

(30) Foreign Application Priority Data

Mar. 20, 2000 (FI) ............................................. 20000647

(51) Int. Cl.⁷ ................................................. G01P 3/46
(52) U.S. Cl. ..................... 702/75; 702/145; 702/147; 324/160; 324/177
(58) Field of Search ............................. 702/75, 57, 64, 702/65, 76–79, 142, 145–147, 179, 181–183, 187, 188, 189, FOR 103, FOR 104, FOR 106–FOR 108, FOR 134, FOR 135, FOR 139, FOR 150, FOR 170; 318/807, 823, 461, 490; 388/901, 907.5, 909; 324/160, 166, 177; 700/290, 304

(56) References Cited

U.S. PATENT DOCUMENTS 5,424,636 A 6/1995 Rollwage et al. ........... 324/177
6,087,796 A 7/2000 Canada et al. .............. 318/565
6,449,567 B1 9/2002 Desai et al. .................. 702/58

FOREIGN PATENT DOCUMENTS

| EP | 0 632 261 A2 | 4/1995 |
|---|---|---|
| WO | WO 99/10715 | 3/1999 |
| WO | 99/10715 | 4/1999 |

OTHER PUBLICATIONS

Alan V. Oppenheim, Ronald W. Shafer: "Discrete–Time Signal Processing" Prentige Hall Inc., New Jersey 1989, pp. 476–480. (No months.

William H. Press, Brian P. Flannery, Saul A. Teukolsky, William T. Vetterling: "Numerical Recipies", Cambridge University Press 1986, pp. 283–286. (No months.

English Language Abstract for 196 00 640 A1 (DE).

*Primary Examiner*—Hal Wachsman
(74) *Attorney, Agent, or Firm*—Dykema Gossett PLLC

(57) ABSTRACT

The present invention relates to a method of determining a speed of rotation of a squirrel-cage motor, wherein samples from the current taken by the squirrel-cage motor are collected by an electric current measuring device at a predetermined sampling frequency for a measurement period, the samples being stored as measurement data of a fixed format. The method is characterized by comprising the step of determining the rotation speed of the squirrel-cage motor from the measurement data by determining the base frequency and side frequencies of the electric current taken by the squirrel-cage motor, the rotation speed frequency of the squirrel-cage motor being obtained by subtracting the lower side frequency from the higher side frequency and by dividing the difference thus obtained by two.

14 Claims, 5 Drawing Sheets

US 6,671,639 B2

METHOD OF DETERMINING SPEED OF ROTATION OF SQUIRREL-CAGE MOTOR AND A COMPUTER SOFTWARE PRODUCT TO CARRY OUT THE METHOD

RELATED APPLICATION

This application is a continuation of PCT/FI01/00272 field Mar. 19, 2001 designating the United States.

FIELD OF THE INVENTION

The invention relates to a method of determining a speed of rotation of a squirrel-cage motor and a computer software product according to the method. The speed of rotation is determined from an electric motor which is of a squirrel-cage motor type.

BACKGROUND OF THE INVENTION

The invention relates to the determining of the rotation speed of squirrel-cage motors. The primary structural aspects determining the speed of rotation of a squirrel-cage motor are the pole pair number of the motor and the frequency of the voltage to be supplied to the motor. An unloaded squirrel-cage motor of a single pole pair rotates, in an ideal case, at a voltage frequency of 50 Hz at a synchronous speed of 3000 rotations per minute. If the number of pole pairs is increased, the synchronous speed of the motor decreases, whereby a motor rotation speed proportional to the pole pair number is arrived at by dividing 3000 rotations per minute by the number of the pole pairs of the squirrel-cage motor.

In other words, when there is no load on a squirrel-cage type motor, the motor rotates at a speed which is almost directly proportional to the frequency of the voltage supplying electric current to the motor, i.e. synchronous speed. The rotation speed of the squirrel-cage motor deviates downward from the synchronous speed by the amount of the motor slip, the rotation speed of the motor being lower than the synchronous speed proportioned to voltage frequency by the amount of the slip.

The rotation speed of a squirrel-cage motor is also proportional to the motor load. As the load on the motor increases, its rotation speed begins to decrease. The motor torque rises steeply, in accordance with the squirrel-cage motor torque curve, up to the point of maximum torque after which the torque starts to decrease again, whereby the load on the motor grows so great that the motor begins to slip from the speed provided by the voltage frequency of the current supply system. FIG. 2 shows the torque curve of a squirrel-cage motor.

Due to the above described phenomenon, the precise instantaneous speed of rotation depends on several factors, i.e. the structure, slip and load of the motor, and the frequency of the voltage supplied to the motor.

In prior art measurement solutions, rotation speed of motors is measured using tachometer or stroboscope measurements. There are, however, major drawbacks in the prior art. When a tachometer is used for measuring speed of rotation, there must be one mounted in the motor, or one must be mounted for the measurement. Correspondingly, when a stroboscope is used, the motor must contain the means for carrying out the measurement. Motors do not usually have built-in speed measurement devices, but the motor must be halted for mounting one. However, motors used in industrial processes cannot usually be halted without causing undue harm for the process of which the motor is a part. In addition, a squirrel cage motor used in an industrial process may be located in a space where the mounting of the measurement device is difficult, or almost impossible. As an example, a gaseous space or one where there is a risk of an explosion could be mentioned.

It is also known in the art to measure the current taken by a motor with an ammeter. The measurement can be carried out by connecting an ammeter coupled to a data collection means, such as a PC, to a wire that supplies electric current to the motor, the measurement being then carried out by collecting samples from the current taken by the motor. The measurement data obtained from the meter is stored in the memory of the data collection means and processed using software which produces a spectrum of the measurement data for visual analysis. This method of determining requires a discrete Fourier analysis (DFT) of the signal. In DFT, the measurement time and the frequency resolution (the distinction between two consecutive frequency points) are interrelated in that the better the desired resolution, the longer is the measurement time required. A long measurement time is a problem, because the motor load, and thereby its speed of rotation, should remain constant during the measurement to allow accurate and reliable measurement data to be collected. When the motor is used in an industrial process, this is not, however, usually possible without causing undue harm for the process. Secondly, in the DFT method the set of frequency points where the calculation is to be carried out is determined in advance by the measurement time and the sampling frequency. If the speed of rotation is not exactly the same as the frequency of any of the frequency points, error will occur in the estimation of fault frequencies, which are proportional to the speed of rotation, and, consequently, amplitude estimate will also be erroneous.

The precise instantaneous rotation speed of the squirrel-cage motor depends on several factors, i.e. on the structure, slip and load of the motor, and the frequency of the voltage supplied to the motor. As illustrated above, drawbacks that often appear in connection with the prior art is the need to halt the motor for the mounting of the speed measurement device, the need for a plural number of measurement devices and, thereby, the need to carry out various measurements to allow an analysis to be made. Moreover, an accurate analysis requires a long measurement time, during which a constant speed of rotation of the motor is required. This naturally slows down and complicates the measurement, and impairs its accuracy and reliability.

BRIEF DESCRIPTION OF THE INVENTION

It is an object of the invention to alleviate the drawbacks of the prior art and to provide an improved method of determining speed of rotation, and computer software implementing the method.

This is achieved by a method and computer software of the present invention comprising the characteristics set forth in the claims.

An underlying idea of the invention is that the speed of rotation of a squirrel-cage motor is determined by measuring, with an ammeter suitable for the purpose, electric current from one phase supplying power to the motor. From the electric current taken by the squirrel-cage motor is collected measurement data at a suitable sampling frequency for a predetermined measurement period. The measurement data is stored in the memory of a data carrier as measurement data of a fixed format from which the rotation speed of the squirrel-cage motor can be estimated by calculation, the electric current taken by the squirrel-cage motor being proportional to the speed of rotation of the motor such that the motor takes the highest current at a frequency corresponding to the base frequency, and a side frequency lower than the base frequency by the rotation frequency and a side frequency higher than the base frequency by the rotation frequency show clearly distinguishable current values, and by determining the frequencies at which they appear, the actual rotation speed of the squirrel-cage motor can be determined by subtracting the lower side frequency from the higher side frequency and by dividing the difference thus obtained by two which allows to determine the instantaneous rotation speed of the squirrel-cage motor. These side frequencies proportional to the pole pair number are estimated from the measurement data using a maximum likelihood estimate (MLE) which is calculated by maximizing the maximum likelihood function (MLF) of the measurement data. The side frequencies proportional to the pole pair number are found at frequency points where the maximum likelihood function (MLF) obtains its highest values.

Before the ML function is calculated to find the side frequencies proportional to the pole pair number, a base frequency is estimated from the measurement data, the estimation being also carried out using the maximum likelihood estimate (MLE) calculated by maximizing the maximum likelihood function (MLF) of the measurement data. The base frequency is found at a frequency point where the maximum likelihood function (MLF) obtains its highest value. Next, a sine signal of the base frequency is generated, the signal having the same amplitude and phase as the base frequency current taken by the squirrel-cage motor from the electric supply network. The signal thus generated is subtracted from the measurement data to provide a more accurate estimation of the frequencies proportional to the pole pair number.

The speed of rotation is determined using the maximum likelihood estimate of the time domain. This provides an advantage in that the measurement time needed for determining the frequency is now significantly shorter than in the conventional DFT method. The reason for this is that in the maximum likelihood method, frequency is produced as a continuous variable and not as separate values in which the minimum difference between two frequency values, i.e. their resolution, is determined by the measurement time and the sampling frequency, as in the commonly used DFT method of the frequency domain. In the maximum likelihood method the only factor having an effect on the accuracy at which the speed of rotation can be determined is the magnitude of interference in the measurement signal.

Practice has shown that for the impact of the interference that is in the measurement signals to be eliminated, the length of the measurement period must be more than 100 times the cycle length of the basic current and voltage frequency. The measurement time is, however, advantageously short in proportion to the variation in the speed of rotation caused by variations in the motor load. For example, at a basic current and voltage frequency of 50 Hz, the required measurement time is 2 seconds in the maximum likelihood method, whereas in DFT methods a measurement time of about 30 seconds is needed to obtain the required resolution.

For sufficiently reliable measurement results, a sampling frequency about three times the highest frequency to be estimated is preferred, i.e. the base frequency with the speed of rotation added thereto.

An advantage of the described method of determining the speed of a squirrel-cage motor is that there is no need to know the shape of the torque curve of the squirrel-cage motor or other parameters relating to it. It suffices to know the pole pair number of the motor and the frequency of the current taken by the motor.

A further advantage is that no speed measuring devices need to be installed to the motor, which produces costs savings. In addition, the collection of the measurement data needed for the speed measurement can be carried out in a central unit feeding the motor, which provides another advantage in that there is no need to enter the motor space or to have separate wiring, but the measurements of even a plural number of motors can be carried out in a centralized manner in one and the same motor feeding central unit. Moreover, this enables the speed measurement method to be used advantageously in connection with a real-time, centralized control and monitoring system.

BRIEF DESCRIPTION OF THE DRAWINGS

In the following the invention will be described with reference to the accompanying drawings, in which.

DETAILED DESCRIPTION OF THE INVENTION

Figure 1:
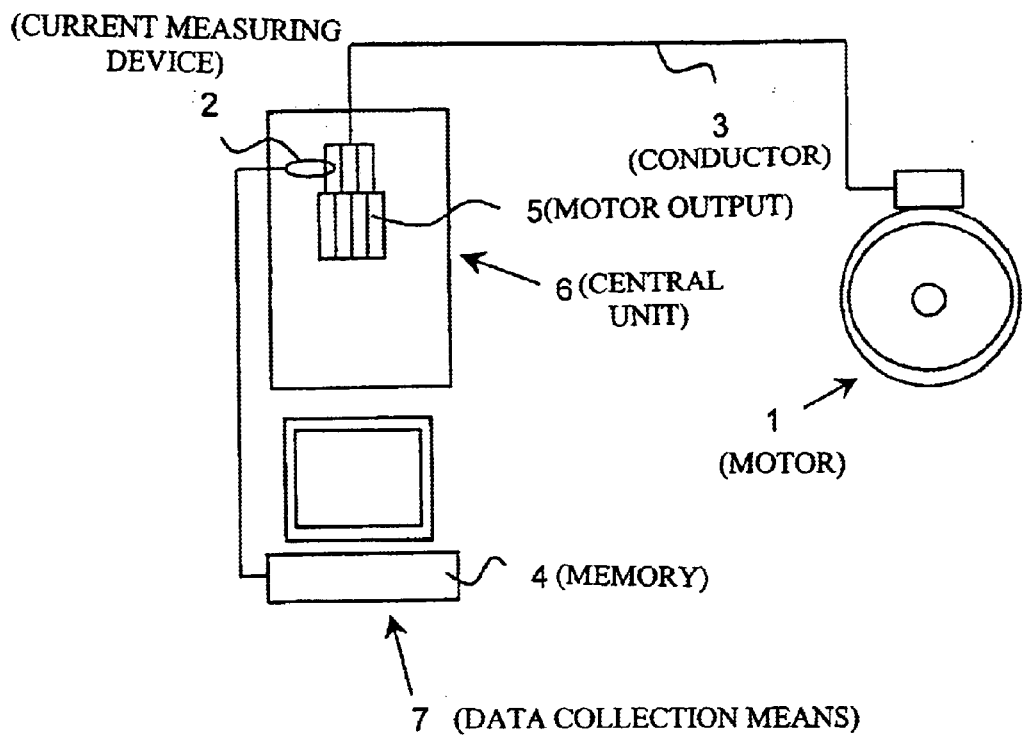
FIG. 1 shows a simplified schematic view of a measurement arrangement of the invention for the determining of a speed of rotation of a squirrel-cage motor.

FIG. 1 shows a simple example of an arrangement according to a preferred embodiment of the invention for the measuring of a speed of rotation of a squirrel-cage motor 1. The embodiment illustrates, by way of example, the determining of the rotation speed of a three-phase squirrel-cage motor 1 on the basis of electric current $I_m$ taken by the motor 1.

The speed of rotation is measured from the squirrel-cage motor 1. Power, i.e. electric current, is supplied to the motor in a conductor 3 at a voltage and frequency typical of an electric supply network. The voltage of an electric supply network is typically 400V and its frequency 50 Hz. A first end of the conductor is coupled to a motor output 5 which is in a central unit 6 and a second end to the electric motor 1. When the squirrel-cage motor 1 is running, it takes electric current $I_m$, depending on loading, which is measured from one phase of the motor output 5 with an ammeter 2 in the central unit 6. Current can be fed to the squirrel-cage motor 1 also with a frequency converter, in which case the voltage to be supplied to the motor 1 and its frequency are variables. However, the basic principle of the invention remains the same also when a frequency converter is used.

The current measuring device 2 is of a clip-on ammeter type, or a similar ammeter. To the current measuring device 2 is coupled a data collection means 7, such as a PC 7, or a similar device provided with a memory means 4 suitable for data collection.

Figure 3:
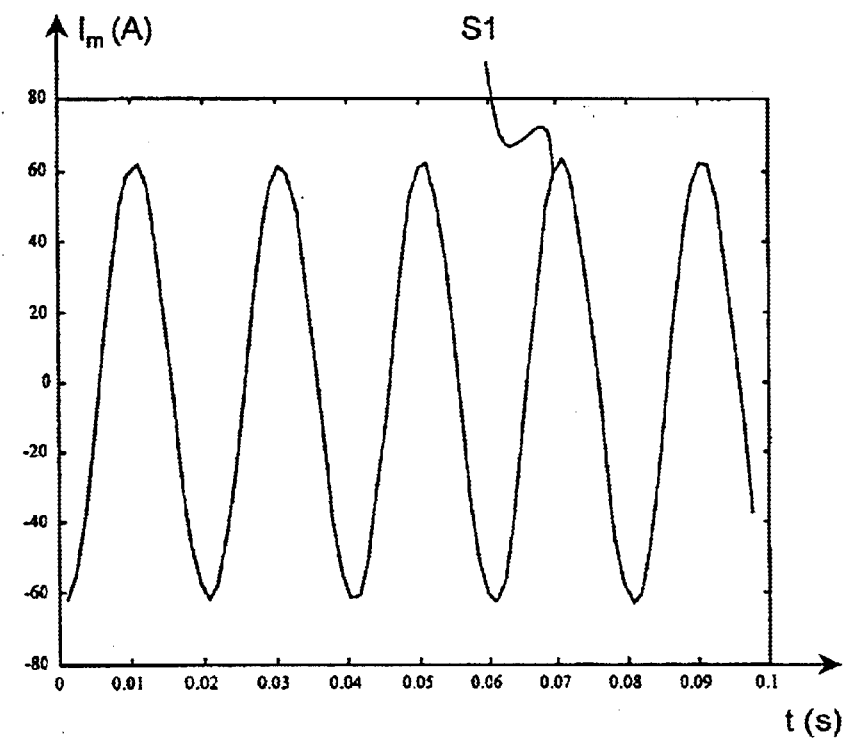
FIG. 3 shows a current measurement data signal taken by the squirrel-cage motor as a function of time.

The data collection means 7 comprises computer software which is used for collecting current measurement data S1 and for storing it in the memory of the data collection means 7 where it is arranged as processable measurement data of a fixed format. The shape of the current measurement data signal S1 is shown in FIG. 3. Before the measurement is initiated, the software is provided with the initial data, to be described below, needed for carrying out the measurement.

The base frequency $f_f$ of the electric current $I_m$ taken by the squirrel-cage motor 1 is the same as the frequency $f_n$ to be supplied to the motor 1, i.e. in the case referred to in this embodiment, the frequency of the electric supply network voltage is about 50 Hz. On the basis of the characteristics of the squirrel-cage motor 1, the pole pair number P of the motor 1 can be determined, the pole pair number in turn determining the synchronous speed $f_t$ of an unloaded squirrel-cage motor 1. The synchronous speed $f_t$ of the squirrel-cage motor 1 is determined on the basis of the pole pair number such that $f_t = f_n/P$, in which formula P=the pole pair number of the squirrel-cage motor, and
$f_n$=the frequency of the voltage of the electric supply network.

Figure 2:
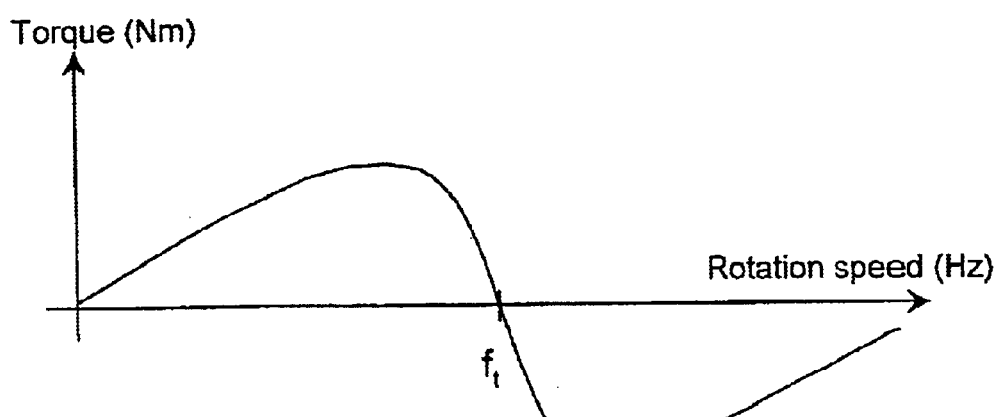
FIG. 2 shows a torque curve of the squirrel-cage motor as a function of the rotation speed.

The torque curve of the squirrel-cage motor 1 is illustrated as a function of the rotation speed in FIG. 2. The Figure shows that as the load increases and the speed of rotation decreases, the torque of the motor 1 increases up to a certain point, after which the torque starts to decrease and the motor 1 begins to slip from the synchronous speed.

The described preferred embodiment assumes that the pole pair number of the squirrel-cage motor 1 is 2. This means that the motor 1 rotates at a synchronous speed $f_t$ of 1500 rotations per minute, i.e. 25 rotations per second, or at a frequency of 25 Hz.

The measurement operation is initiated by connecting the current measuring device 2, i.e. the clip-on ammeter or a similar ammeter, to measure the electric current $I_m$ taken by the squirrel-cage motor 1. The measurement is carried out from one phase of the motor output 5 in the central unit 6. To the current measuring device 2 is coupled a data collection means 7 comprising a data carrier 4 in which measurement data S1 will be stored.

Next, the length of the measurement period T used in the data collection is set. To provide reliable results, the length of the measurement period T is at least 100 times the cycle length of the base frequency $f_f$ of the squirrel-cage motor 1, the base frequency $f_f$ being the same as the frequency $f_n$ of the voltage to be supplied to the motor 1. With a base frequency $f_f$ of 50 Hz, a measurement period T length of 2 seconds is required.

The next step is to set the sampling frequency $f_s$ to be applied in the data collection. To provide a reliable measurement result, the sampling frequency $f_s$ must be at least three times the sum of the synchronous speed $f_t$ of the squirrel-cage motor 1 and the base frequency $f_f$. When the synchronous speed $f_t$ of the motor 1 is 25 Hz and the frequency $f_n$ of the electric supply network is 50 Hz, a sampling frequency of at least 3 times 75 Hz, i.e. at least 225 Hz, is required.

The measurement is then initiated by collecting samples from the electric current $I_m$ taken by the squirrel-cage motor 1 at the set sampling frequency $f_s$ for the measurement period T. The data collection means 7 comprises computer software for collecting the measurement data and for storing it in the memory of the data collection means 7 where it is arranged as processable measurement data S1 of a fixed format.

After the measurement data S1 have been collected and stored in the memory of the data collection means 7, the measurement data S1 is processed with the computer software which determines the speed of the rotation $f_r$ of the squirrel-cage motor 1. The measurement data S1 is illustrated graphically in FIG. 3.

The determining of the rotation speed of the squirrel-cage motor 1 begins by first determining from the measurement data S1 the base frequency $f_f$ of the electric current $I_m$ taken by the squirrel-cage motor 1. This is carried out in the time domain, using a maximum likelihood estimate (MLE) calculated by maximizing the maximum likelihood function J adjusted to the measurement data S1. The base frequency $f_f$ is found at the frequency point where the maximum likelihood function J obtains its highest value.

The maximum likelihood function to be used for determining the base frequency $f_f$ of the electric current $I_m$ taken by the squirrel-cage motor 1 takes the following form:

$$J = ABS\left(\sum_{n=0}^{N-1} x[n]e^{-j2\pi n v_f}\right),$$

in which formula
ABS=the absolute value of a complex number
J=a maximum likelihood function (MLF) to be maximized
N=the number of samples
n=the order number of a sample
x[n]=an individual sample
$v_f$=a digital frequency of base frequency $f_f$ of a sinusoidal electric current $I_m$ which is to be estimated $v_f = f_f/f_s$, in which formula
$f_f$=base frequency $f_f$ of electric current $I_m$ taken by the motor
$f_s$=sampling frequency.

In the following, the operation of the method will be described with reference to FIG. 6 which shows a principle for determining the rotation speed of the squirrel-cage motor 1 from the maximum likelihood function J adjusted to the measurement data S1.

In the first step, a rotation speed search interval 20, 21 is determined, i.e. an initial frequency point $f_{ini}$ 20 and an end point $f_{end}$ 21 of frequency. The point of origin of the search interval 20, 21 is obtained on the basis of the frequency $f_n$ of the voltage to be supplied to the squirrel-cage motor, which is 50 Hz in this embodiment. At voltage frequency $f_n$ of 50 Hz, the initial point 20 of the search interval 20, 21 is selected such that $f_{ini}$=49 Hz and the end point 21 such that $f_{end}$=51 Hz.

In the second step, the measurement data signal S1 is filtered with a bandpass filter, such as a FIR (Finite Impulse Response) filter of the 50$^{th}$ order, the coefficients of which have been calculated using an optimal Parks-McClellan algorithm (Alan V. Oppenheim, Ronald W. Scafer: "Discrete-Time Signal Processing" Prentige Hall Inc., New Jersey 1989, pp. 476–479). The search interval 20, 21 is located on the passband of the bandpass filter.

In the third step, the search interval 20, 21 is divided into sub-intervals 10, 11, 12, 13, 14 of an equal length such that $$f_k = f_{ini} + k(f_{end} - f_{ini})/N, \text{ where } k=0, 1, \ldots, N.$$

As shown in the example of FIG. 2, the number of sub-intervals is selected such that N=5, whereby the end points of the sub-intervals are denoted in sub-interval 10 by points 10a=49 Hz and 10b=49.4 Hz, in sub-interval 11 by points 11a=49.4 Hz and 11b=49.8 Hz, in sub-interval 12 by points 12a=49.8 Hz and 12b=50.2 Hz, in sub-interval 13 by points 13a=50.2 Hz and 13b=50.6 Hz, and in sub-interval 14 by points 14a=50.6 Hz and 14b=51 Hz.

In the fourth step, the highest value of the maximum likelihood function J is determined in each sub-interval:

$$J_k^{max} = \max(J(f_k^{max})), \text{ where } k=1, 2, \ldots, N \ f_k^{max} \in [f_{k-1}, f_k]$$

Figure 6:
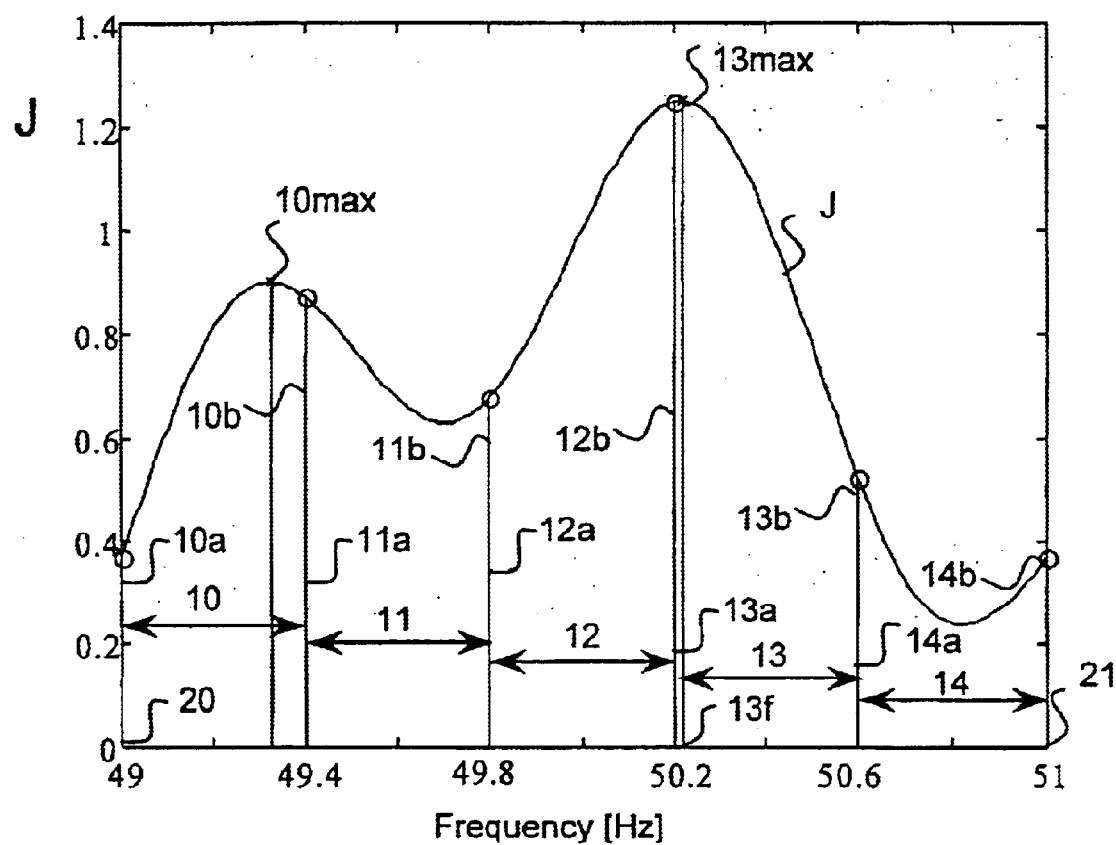
FIG. 6 shows a principle of determining a base frequency from a maximum likelihood function adjusted to measurement data.

As shown in FIG. 6, in the second 11, third 12 and fifth 14 sub-intervals the maximum likelihood function J obtains its highest value at end point 11a, where $f_2^{max}$=49.4 Hz, end point 12b, where $f_3^{max}$=50.2 Hz, and end point 14a, where $f_5^{max}$=50.6 Hz. In the first 10 and fourth 13 sub-intervals the maximum likelihood function J has a local maximum value $J_k^{max}$. In FIG. 2 the local maximum values are at points 10 max, where $f_1^{max}$=49.33 Hz and 13 max, where $f_4^{max}$=50.22 Hz. The highest value of the maximum likelihood function J is searched for using for example the Brent method (William H. Press, Brian P. Flannery, Saul A. Teukolsky, William T. Wetterling: "Numerical Recipies", Cambridge University Press 1986, pp. 283–286).

In the fifth step, the base frequency $f_f$ is selected to be an $f_k^{max}$ value corresponding to the highest value of maximum likelihood function $J_k^{max}$. In the example of FIG. 6 the base frequency thus arrived at is value $f_4^{max}$=50.22 Hz 13f which corresponds to the highest maximum likelihood function value $J_4^{max}$ 13 max of the calculated $f_k^{max}$ values. Consequently, the base frequency $f_f$ of the current $I_m$ taken by the squirrel-cage motor 1 determined by the method of the invention is 50.22 Hz.

Figure 4:
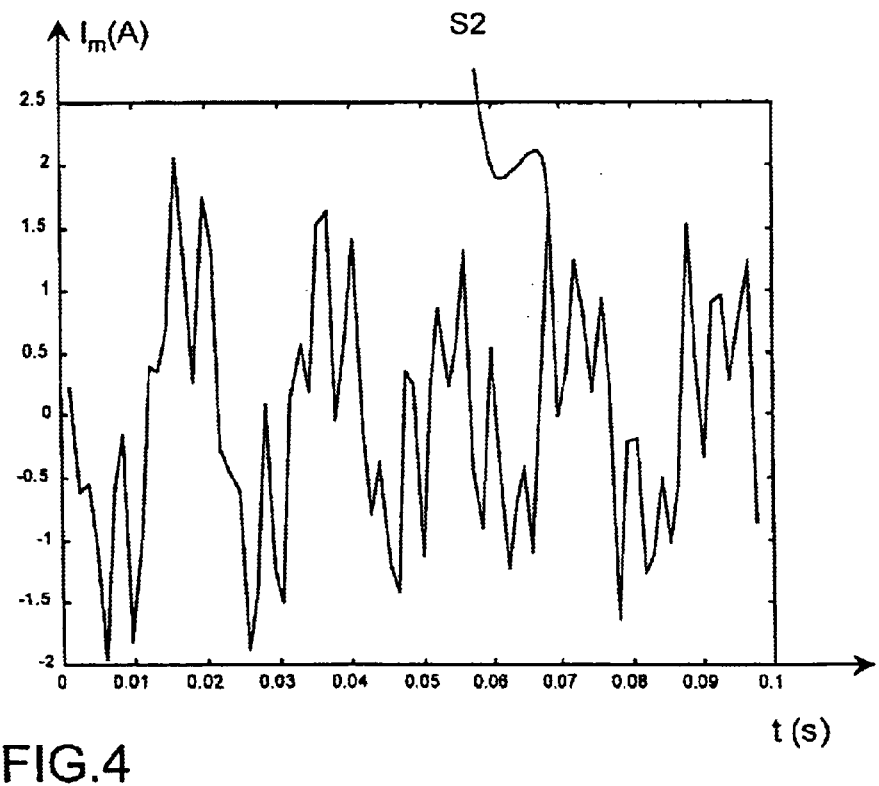
FIG. 4 shows a current measurement data signal taken by the squirrel-cage motor as a function of time when a sine signal of a base frequency has been subtracted from the current measurement data signal.

Next, a sinusoidal signal based on the base frequency $f_f$ of the current $I_m$ taken by the squirrel-cage motor 1 is generated, the amplitude and phase of the signal being the same as the amplitude and phase of the base frequency $f_f$ current taken by the squirrel-cage motor 1. The amplitude and phase of the sinusoidal signal based on the base frequency $f_f$ are estimated from the measurement data by applying the method of least squares. The generated signal is subtracted from the measurement data to provide a more accurate estimation of frequencies $f_1$ and $f_2$ proportional to the pole pair number P. FIG. 4 is a graphic illustration of measurement data signal S2 from which the sinusoidal signal based on the base frequency $f_f$ of the current $I_m$ taken by the squirrel-cage motor 1 has been subtracted, the amplitude and phase of the signal being the same as the amplitude and phase of the base frequency $f_f$ current taken by the squirrel-cage motor 1.

Figure 5:
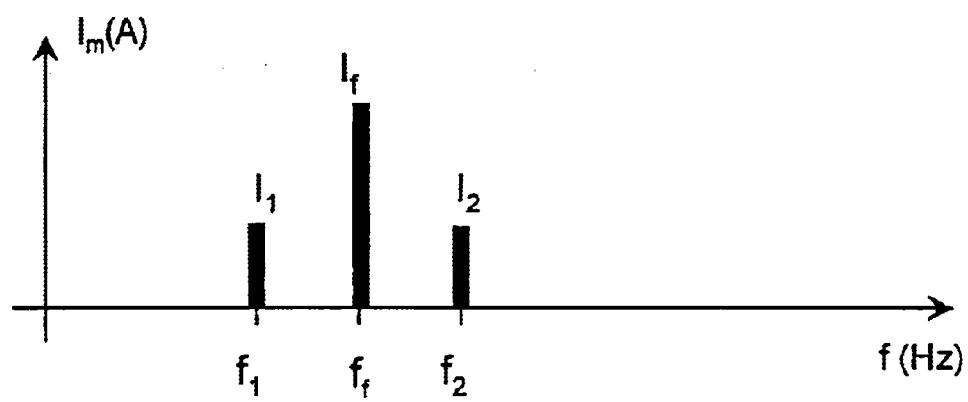
FIG. 5 shows a schematic view of current taken by the squirrel-cage motor as a function of time.

As shown in FIG. 5, substantially measurable current values $I_1$, $I_2$ are detected at side frequencies $f_1$, $f_2$, the first side frequency $f_1$ appearing at a frequency formed of the base frequency $f_f$ from which is subtracted the rotation speed frequency $f_r$, i.e. $f_1 = f_f - f_r$, and the second side frequency $f_2$ appearing at a frequency formed of the base frequency $f_f$ to which is added the rotation speed frequency $f_r$, i.e. $f_1 = f_f + f_r$. By estimating the frequencies $f_1$, $f_2$ at which the current values $I_1$, $I_2$ appear, the rotation speed frequency $f_r$ of the squirrel-cage motor 1 can be determined by subtracting the lower side frequency $f_1$ from the higher side frequency $f_2$ and by dividing the difference thus obtained by two, i.e.

$$f_r = (f_2 - f_1)/2.$$

The side frequencies $f_1$, $f_2$ are estimated from the measurement data in the time domain by applying a maximum likelihood estimate which is calculated by maximizing the maximum likelihood function adjusted to the measurement data, the frequencies being found at frequency points $f_1$ and $f_2$ where the maximum likelihood function obtains its highest value.

The side frequency $f_1$ is estimated as follows. As already stated, it is assumed that the pole pair number of the squirrel-cage motor 1 is 2. This means that the motor 1 runs at a synchronous speed $f_t$ of 1500 rotations per minute, i.e. 25 rotations per second, or at a frequency of 25 Hz. The side frequency $f_1$ appears approximately at a frequency formed of the base frequency $f_f$ from which is subtracted the rotation speed frequency $f_r$ of the motor, i.e. $f_1 = f_f - f_r$. The side frequency $f_1$ thus appears approximately at a frequency of 25 Hz.

The determining of the side frequency $f_1$ begins by subtracting from the measurement data the sinusoidal signal based on the base frequency $f_f$ of the electric current $I_m$ taken by the squirrel-cage motor 1. The side frequency $f_1$ is determined from the signal S2 thereby generated, shown in FIG. 4, in the time domain by using the maximum likelihood estimate (MLE) calculated by maximizing the maximum likelihood function J adjusted to the signal. The side frequency $f_1$ is found at the frequency point at which the maximum likelihood function J obtains its highest value.

The maximum likelihood function to be used for estimating a precise value for the side frequency $f_1$ takes the following form:

$$J = \text{ABS}\left(\sum_{n=0}^{N-1} x(n) e^{-j2\pi n v_1}\right),$$

in which formula
ABS=the absolute value of a complex number
J=a maximum likelihood function (MLF) to be maximized
N=the number of samples
n=the order number of a sample
x(n)=an individual sample
$v_1$=a digital frequency of side frequency $f_2$ of sinusoidal electric current $I_2$ which is to be estimated $$v_1 = f_1/f_s,$$

in which formula
$f_1$=side frequency $f_1$ of electric current $I_1$, and
$f_s$=sampling frequency.

In the following, the operation of the method will be described with reference to FIG. 7 which shows a principle for determining the side frequency $f_1$ from the maximum likelihood function J adjusted to the measurement data S2.

In the first step, a side frequency $f_1$ search interval 40, 41 is determined, i.e. an initial frequency point $f_{ini}$ 40 and an end point $f_{end}$ 41 of frequency. The point of origin of the search interval 40, 41 is obtained on the basis of the base frequency $f_f$ from which is subtracted the synchronous speed ft of the squirrel-cage motor 1. Consequently, the initial point 40 of the search interval 40, 41 is selected such that $f_{ini}$=25 Hz and the end point 21 such that $f_{end}$=27 Hz.

In the second step, the measurement data signal S2 is filtered with a bandpass filter, such as a FIR filter of the 50$^{th}$ order, similarly as in connection with the determining of the base frequency $f_f$.

In the third step, the search interval 40, 41 is divided into sub-intervals 30, 31, 32, 33, 34 of an equal length such that $$f_k=f_{ini}+k(f_{end}-f_{ini})/N, \text{ where } k=0, 1, \ldots, N.$$

Figure 7:
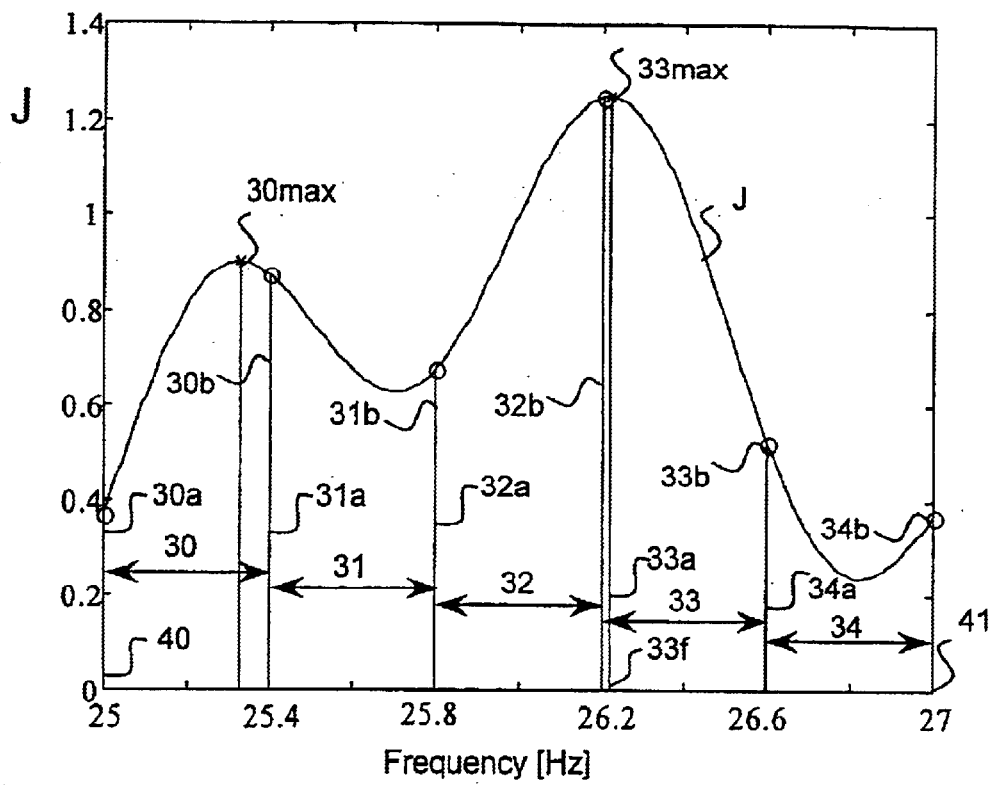
FIG. 7 shows a principle of determining a first side frequency from a maximum likelihood function adjusted to measurement data.

As shown in the example of FIG. 7, the number of sub-intervals is selected such that N=5, whereby the end points of the sub-intervals are denoted in sub-interval 30 by points 30a=25 Hz and 30b=25.4 Hz, in sub-interval 31 by points 31a=25.4 Hz and 31b=25.8 Hz, in sub-interval 32 by points 32a=25.8 Hz and 32b=26.2 Hz, in sub-interval 33 by points 33a=26.2 Hz and 33b=26.6 Hz, and in sub-interval 34 by points 34a=26.6 Hz and 34b=27 Hz.

In the fourth step, the highest value of the maximum likelihood function J is determined in each sub-interval:

$$J_k^{max}=\max(J(f_k^{max})), \text{ where } k=1, 2, \ldots, N \, f_k^{max} \in [f_{k-1}, f_k]$$

As shown in FIG. 7, in the second 31, third 32 and fifth 34 sub-intervals the maximum likelihood function J obtains its highest value at end point 31a, where $f_2^{max}$=25.4 Hz, end point 32b, where $f_3^{max}$=26.2 Hz, and end point 44a, where $f_5^{max}$=26.6 Hz. In the first 30 and fourth 33 sub-intervals the maximum likelihood function J has a local maximum value $J_k^{max}$. In FIG. 7 the local maximum values are at points 30 max, where $f_1^{max}$=25.33 Hz, and 33 max, where $f_4^{max}$=26.22 Hz. The highest value of the maximum likelihood function J is searched for using for example the Brent method, similarly as in connection with the determining of the base frequency $f_f$.

In the fifth step, the side frequency $f_1$ is selected to be an $f_k^{max}$ value corresponding to the highest value of maximum likelihood function $J_k^{max}$ In the example of FIG. 7 the side frequency $f_1$ thus arrived at is value $f_4^{max}$=26.22 Hz 33f which corresponds to the highest maximum likelihood function value $J_4^{max}$ 33 max of the calculated $f_k^{max}$ values. Consequently, the side frequency $f_1$ of the current $I_m$ taken by the squirrel-cage motor 1 determined by the method of the invention is 26.22 Hz.

The estimation of the side frequency $f_2$ is carried out similarly as $f_2$ estimation. The side frequency $f_2$ appears approximately at a frequency formed of the base frequency $f_f$ to which is added the synchronous speed frequency $f_t$, i.e. $f_1=f_f+f_t$. The side frequency $f_2$ thus appears approximately at a frequency of 75 Hz.

The determining of the side frequency $f_2$ begins by subtracting from the measurement data S1 the sinusoidal signal based on the base frequency $f_f$ of the current $I_m$ taken by the squirrel-cage motor 1. The side frequency $f_2$ is determined from the measurement data signal S2 thereby generated in the time domain by using the maximum likelihood estimate (MLE) calculated by maximizing the maximum likelihood function J adjusted to the signal. The side frequency $f_2$ is found at the frequency point at which the maximum likelihood function J obtains its highest value.

The maximum likelihood function to be used for estimating a precise value for the side frequency $f_2$ takes the following form:

$$J = \text{ABS}\left(\sum_{n=0}^{N-1} x(n)e^{-j2\pi n v_2}\right),$$

in which formula
 ABS=the absolute value of a complex number
 J=a maximum likelihood function (MLF) to be maximized
 N=the number of samples
 n=the order number of a sample
 x(n)=an individual sample
 $v_2$=digital frequency of a sinusoidal signal to be estimated $$v_2=f_2/f_s,$$

in which formula
 $f_2$=digital frequency of side frequency $f_2$ of electric current $I_2$, and
 $f_s$=sampling frequency.

In the following, the operation of the method will be described with reference to FIG. 8 which illustrates a principle for determining the side frequency $f_2$ from the maximum likelihood function J adjusted to measurement data S2.

In the first step, a rotation speed search interval 60, 61 is determined, i.e. an initial frequency point $f_{ini}$ 60 and an end point $f_{end}$ 61 of frequency. The point of origin of the search interval 60, 61 is obtained on the basis of the base frequency $f_f$ to which is added the synchronous speed of the squirrel-cage motor 1. Consequently, the initial point 60 of the search interval 60, 61 is selected such that $f_{ini}$=73 Hz and the end point 61 such that $f_{end}$=75 Hz.

In the second step, measurement data signal S2 is filtered with a bandpass filter, such as a FIR filter of the 50$^{th}$ order, similarly as in connection with the determining of the base frequency $f_f$.

In the third step, the search interval 60, 61 is divided into sub-intervals 50, 51, 52, 53, 54 of an equal length such that $$f_k=f_{ini}+k(f_{end}-f_{ini})/N, \text{ where } k=0, 1, \ldots, N.$$

Figure 8:
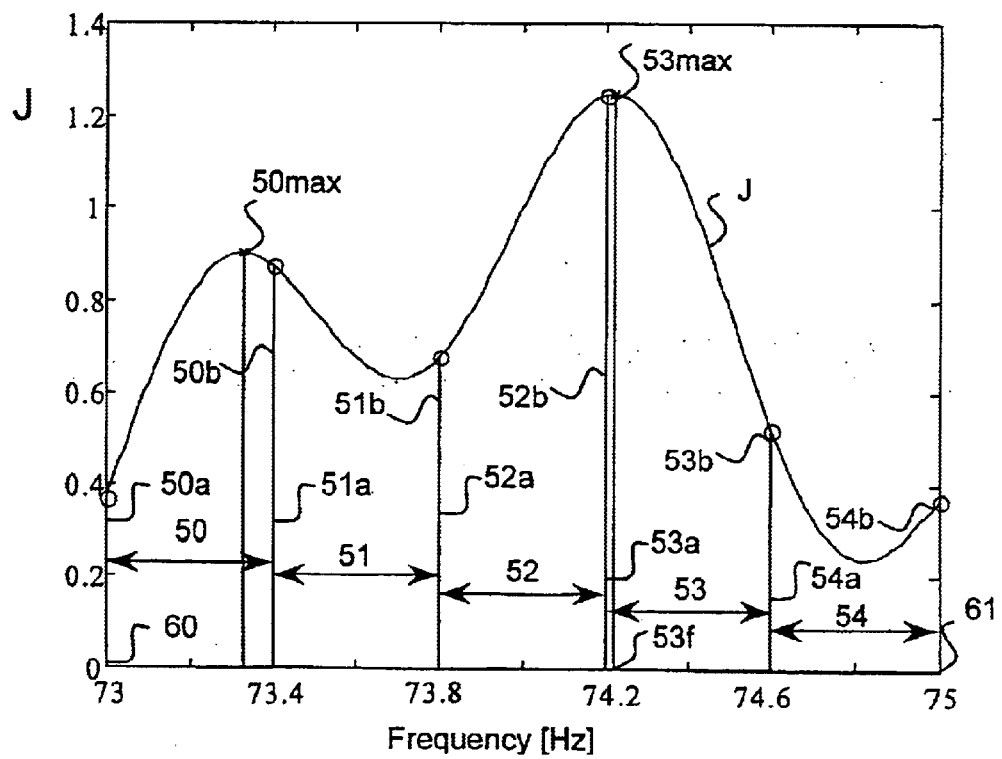
FIG. 8 shows a principle of determining a second side frequency from a maximum likelihood function adjusted to measurement data.
Figure 9:
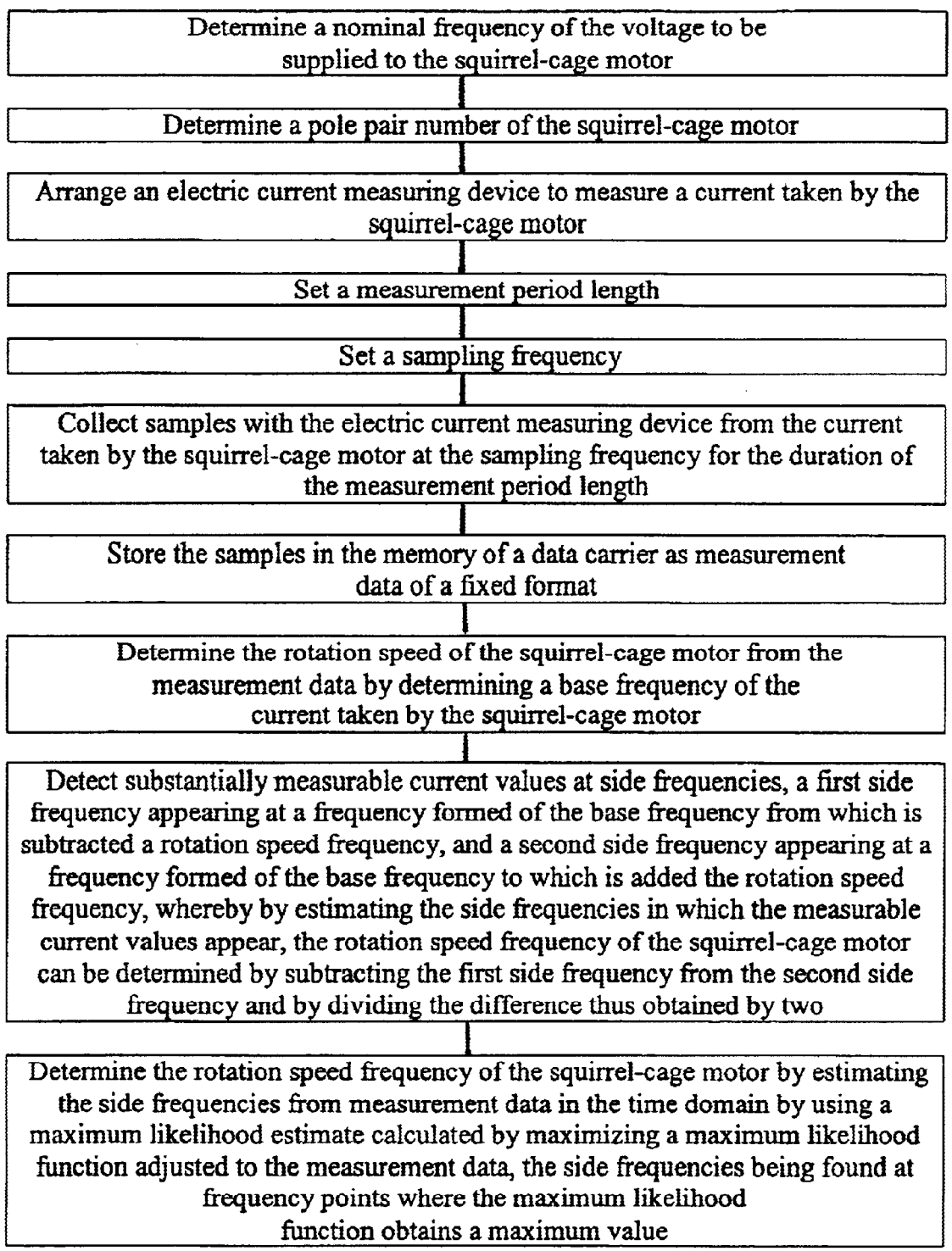
FIG. 9 is an exemplary flowchart for determining the speed of rotation of the squirrel-cage motor.

As shown in the example of FIG. 8, the number of sub-intervals is selected such that N=5, whereby the end points of the sub-intervals are denoted in sub-interval 50 by points 50a=73 Hz and 50b=73.4 Hz, in sub-interval 51 by points 51a=73.4 Hz and 51b=73.8 Hz, in sub-interval 52 by points 52a=73.8 Hz and 52b=74.2 Hz, in sub-interval 53 by points 53a=74.2 Hz and 53b=74.6 Hz, and in sub-interval 54 by points 54a=74.6 Hz and 54b=75 Hz.

In the fourth step, the highest value of the maximum likelihood function J is determined in each sub-interval:

$$J_k^{max}=\max(J(f_k^{max})), \text{ where } k=1, 2, \ldots, N \, f_k^{max} \in [f_{k-1}, f_k]$$

As shown in FIG. 8, in the second 51, third 52 and fifth 54 sub-intervals the maximum likelihood function J obtains its highest value at end point 51a, where $f_2^{max}$=73.4 Hz, end point 52b, where $f_3^{max}$=74.2 Hz, and end point 54a, where $f_5^{max}$=74.6 Hz. In the first 50 and fourth 53 sub-intervals the maximum likelihood function J has a local maximum value $J_k^{max}$. In FIG. 8 the local maximum values are at points 50 max, where $f_1^{max}$=73.33 Hz and $f_4^{max}$=74.22 Hz. The highest value of the maximum likelihood function J is searched for using for example the Brent method, similarly as in connection with the determining of the base frequency $f_f$.

In the fifth step, the side frequency $f_2$ is selected to be an $f_k^{max}$ value corresponding to the highest value of maximum likelihood function $J_k^{max}$. In the example of FIG. 8 the side frequency $f_2$ thus arrived at is value $f_4^{max}$=74.22 Hz 53$f$ which corresponds to the highest maximum likelihood function value $J_4^{max}$ 53 max of the calculated $f_k^{max}$ values. Consequently, the side frequency $f_2$ of the current $I_2$ taken by the squirrel-cage motor 1 determined by the method of the invention is 74.22 Hz.

Finally, the rotation speed of the squirrel-cage motor 1 is determined by calculating it from the estimated side frequencies $f_1$ and $f_2$, the rotation speed frequency $f_r$ of the squirrel-cage motor 1 being obtained by subtracting the lower side frequency $f_1$ from the higher side frequency $f_2$ and by dividing the difference thus obtained by two, i.e.

$$f_r=(f_2-f_1)/2.$$

In this example $f_r$=(74.22−26.22) Hz/2=24 Hz, i.e. 1440 rotations per minute.

It is to be understood that the above specification and the accompanying Figures are only intended to illustrate the present invention. The invention is thus not restricted to the embodiment described above or disclosed in the claims, but a person skilled in the art will find it apparent that diverse variations and modifications can be made to the invention within the inventive idea disclosed in the accompanying claims.

What is claimed is:

1. A method of determining a speed of rotation of a squirrel-cage motor, the method comprising:
    determining a nominal frequency of the voltage to be supplied to the squirrel-cage motor;
    determining a pole pair number of the squirrel-cage motor;
    arranging an electric current measuring device to measure a current taken by the squirrel-cage motor;
    setting a measurement period length;
    setting a sampling frequency;
    collecting samples with the electric current measuring device from the current taken by the squirrel-cage motor at the sampling frequency for the duration of the measurement period length;
    storing the samples in the memory of a data carrier as measurement data (S1) of a fixed format,
    determining the rotation speed of the squirrel-cage motor from the measurement data (S1) by determining a base frequency of the current taken by the squirrel-cage motor,
    detecting substantially measurable current values at side frequencies, a first side frequency appearing at a frequency formed of the base frequency from which is subtracted a rotation speed frequency, and a second side frequency appearing at a frequency formed of the base frequency to which is added the rotation speed frequency, whereby by estimating the side frequencies in which the measurable current values appear, the rotation speed frequency of the squirrel-cage motor can be determined by subtracting the first side frequency from the second side frequency and by dividing the difference thus obtained by two, and
    determining the rotation speed frequency of the squirrel-cage motor by estimating the side frequencies from measurement data (S2) in the time domain by using a maximum likelihood estimate calculated by maximizing a maximum likelihood function adjusted to the measurement data (S2), the side frequencies being found at frequency points where the maximum likelihood function obtains a maximum value.

2. The method according to claim 1, wherein from the measurement data (S1) the base frequency of the current taken by the squirrel-cage motor is determined in the time domain by using a maximum likelihood estimate calculated by maximizing a maximum likelihood function adjusted to the measurement data (S1), the base frequency being found at a frequency point where the maximum likelihood function obtains a maximum value.

3. The method according to claim 2, wherein an approximate of the rotation speed frequency of the squirrel-cage motor is calculated by using the following formula:

$$f_r=f_f/P, \text{ in which formula}$$

P=the pole pair number of the squirrel-cage motor, and
$f_f$=the base frequency of the current taken by the squirrel-cage motor.

4. The method according to claim 3, wherein the amplitude and phase of the generated sinusoidal signal based on the base frequency of the current taken by the squirrel-cage motor are estimated from the measurement data (S1) by applying the method of least squares.

5. The method according to claim 1, wherein a sinusoidal signal based on the base frequency of the current taken by the squirrel-cage motor is further generated, the generated sinusoidal signal being subtracted from the measurement data (S1) to provide an accurate estimation of the side frequencies proportional to the pole pair number.

6. The method according to claim 1, wherein the side frequencies proportional to the pole pair number of the squirrel-cage motor appear approximately at frequency points proportional to the pole pair number of the squirrel-cage motor according to the following formulae:

$$f_1(P)=f_f-f_f/P$$

and $$f_2(P)=f_f+f_f/P, \text{ in which formulae}$$

$f_1(P)$=the lower frequency proportional to the pole pair number P of the squirrel-cage motor;
$f_2(P)$=the higher frequency proportional to the pole pair number P of the squirrel-cage motor;
P=the pole pair number of the squirrel-cage motor; and
$f_f$=the base frequency of the current taken by the squirrel-cage motor.

7. A method according to claim 1, wherein the maximum likelihood function takes the following form:

$$J = \text{ABS}\left(\sum_{n=0}^{N-1} x[n]e^{-j2\Pi v_i n}\right)$$

ABS=the absolute value of a complex number
J=a maximum likelihood function to be maximized
N=the number of samples
n the order number of a sample
x[n]=an individual sample
$v_i$=a digital frequency of a sinusoidal signal which is to be estimated $$v_i=f_1/f_s,$$

in which formula
$f_s$=sampling frequency and the index of both $\upsilon_i$ and $f_i$, is f, 1 or 2, depending on the frequency to be estimated.

8. The method according to claim 1, wherein the length of the measurement period is at least 100 times the cycle length of the base frequency of the squirrel-cage motor.

9. The method according to claim 1, wherein the sampling frequency is at least three times the sum of the base frequency and the rotation speed frequency of the squirrel cage motor.

10. The method according to claim 1, wherein the base frequency and side frequencies are determined using a maximum likelihood estimate of the time domain.

11. The method according to claim 1, wherein the measurement of current is carried out on the current of one phase feeding the current to the squirrel-cage motor.

12. The method according to claim 1, wherein the current measuring device is a clip-on ammeter.

13. The method according to claim 1, wherein the measurement of the squirrel-cage motor current is carried out in a central unit feeding the squirrel-cage motor.

14. A computer software product for determining speed of rotation of a squirrel-cage motor and being executable on a computer, the product comprising:

a program code portion for collecting samples with an electric current measuring device from a current taken by the squirrel-cage motor at a sampling frequency for a duration of a measurement period;

a program code portion for storing the samples in the memory of a data carrier as measurement data of a fixed format;

a program code portion for determining the rotation speed of the squirrel-cage motor from the measurement data by determining a base frequency of the current taken by the squirrel-cage motor, a program code portion for detecting substantially measurable current values at side frequencies, a first side frequency appearing at a frequency formed of the base frequency from which is subtracted a rotation speed frequency, and a second side frequency appearing at a frequency formed of the base frequency to which is added the rotation speed frequency, whereby by estimating the side frequencies in which the measurable current values appear, the rotation speed frequency of the squirrel-cage motor can be determined by subtracting the first side frequency from the second side frequency and by dividing the difference thus obtained by two; and a program code portion for determining the rotation speed frequency of the squirrel-cage motor by estimating the side frequencies from the measurement data in the time domain by using a maximum likelihood estimate calculated by maximizing a maximum likelihood function adjusted to the measurement data, the side frequencies being found at frequency points where the maximum likelihood function obtains a maximum value.

* * * * *